(No Model.)
A. & E. LISTER.
Process of, and Apparatus for, Treating Animal Matter.
No. 236,600. Patented Jan. 11, 1881.
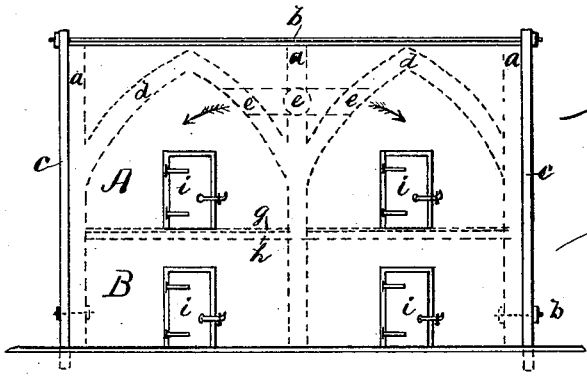
Fig. 1.
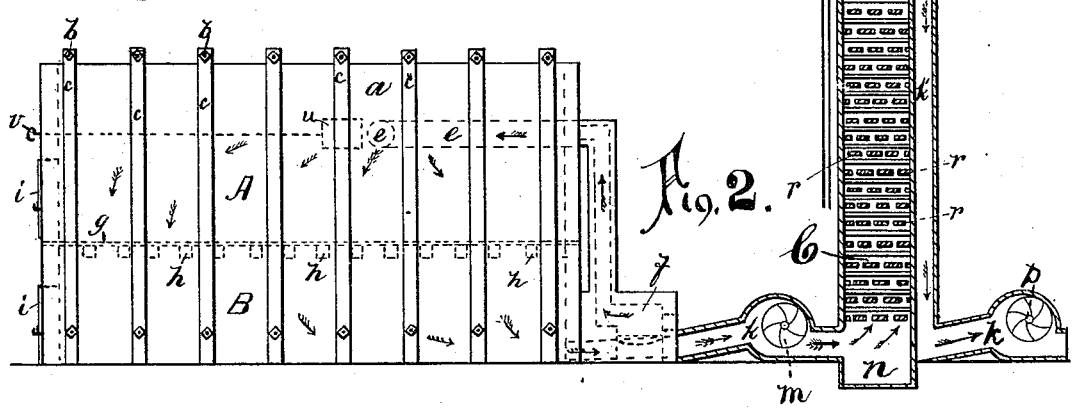
Fig. 2.
Fig. 3.
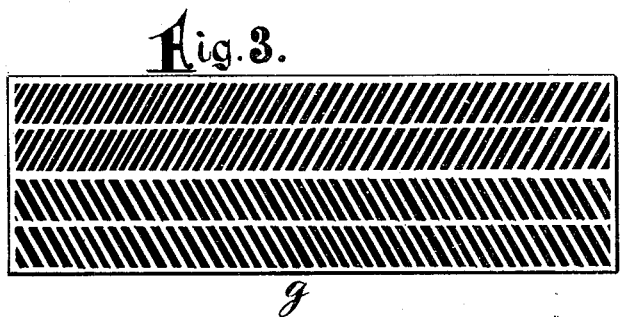
Fig. 4.
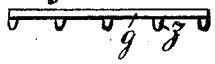
Fig. 5.
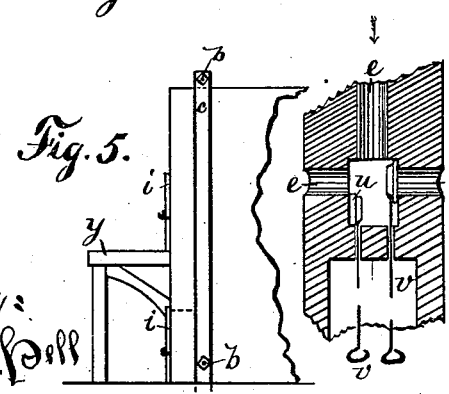
Fig. 6.
Fig. 7.
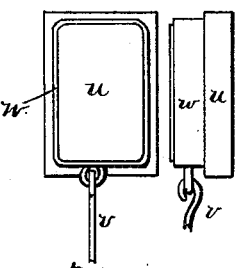
Attest:
Charles H. Poll
Chas. Herr.
Inventor:
Alfred Lister,
Edwin Lister,
By O. Drake, Atty

UNITED STATES PATENT OFFICE.

ALFRED LISTER AND EDWIN LISTER, OF NEWARK, NEW JERSEY.

PROCESS OF AND APPARATUS FOR TREATING ANIMAL MATTER.

SPECIFICATION forming part of Letters Patent No. 236,600, dated January 11, 1881.

Application filed October 23, 1880. (No model.)

*To all whom it may concern:*

Be it known that we, ALFRED LISTER and EDWIN LISTER, of Newark, in the county of Essex and State of New Jersey, have invented certain new and useful Improvements in Process of and Apparatus for Treating Animal Matter and the gases therewith connected; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to dry bones and other similar animal tissues in the process of manufacturing animal-charcoal and fertilizers, to do it more perfectly and quickly with the least outlay of labor, and, further, to take the obnoxious gases and vapors arising from said drying process, to clarify and deodorize the same, and to render them fit to send into the open air, thus doing away with any cause for complaint by residents neighboring the factory.

The invention consists in the combination, with a drying oven or ovens divided into upper and lower chambers by grated flooring and communicating with a furnace, substantially as shown, of a chamber having blowers connected therewith, and having transverse bars therein, arranged in the manner shown, so that water falling thereon and the before-mentioned gases passing therethrough will be brought into intimate connection, all the said parts being arranged and operating substantially as will hereinafter be set forth, illustrated, and claimed.

It consists, also, in the further combination, arrangement, and conformation of parts, as will be hereinafter more fully set forth and illustrated, and finally definitely claimed.

Referring to the accompanying drawings, in which similar letters of reference indicate like parts in each of the several figures, Figure 1 is a front elevation of the oven, showing the internal arrangement thereof in dotted outline; Fig. 2, a side elevation of the same with the purifying apparatus attached, the latter being shown in section. Fig. 3 is a plan view of a section of the flooring between the upper and lower chambers herein specified. Fig. 4 is an end view of the same; and Figs. 5, 6, and 7 are further detached portions.

The construction of the ovens and apparatus attached is substantially as follows:

The walls are constructed, preferably, of brick, which, being in a degree inexpansible, are thus adapted to be kept intact; and as brick is also notably a poor conductor of heat, it is therefore pre-eminently suited to the purpose. However, as the said walls do slightly expand and contract by the varying degrees of heat to which they are subjected, said heat being alternately extreme and moderate, the side walls, $a$ $a$, are tied together by the bolts $b$ and braces $c$.

The ovens are arched over, as indicated in Fig. 1. Said arches, being lettered $d$ in Fig. 1, are perforated by the heat-conducting flue $e$, connected with the furnace $f$. In the case shown said flue $e$ passes from the said furnace, traverses the center wall, and at a point approximately between the front and rear walls divides and enters each oven, substantially as shown in Fig. 6. The flues are opened and closed by dampers $u$, Figs. 2, 6, 7, which are operated from the front of the furnace by the aid of the handled rod $v$. By these means the ovens can be used alternately. While one is drying the animal matter the other can be opened to allow the dried material to be replaced by fresh matter, and thus time is saved and the heat more perfectly utilized.

The dampers $u$ are formed of brick-clay, as shown in Fig. 7, $w$ being a collar running around a portion thereof, upon which to fasten the handle $v$. Said dampers slide over the flues in the manner readily understood by reference to Fig. 6.

It is evident that to gain access to the upper chambers, A, there must be galleries or other flooring constructed before the doors thereof to allow the matter to be wheeled therein. Said galleries are indicated by $y$, Fig. 5.

Each oven is subdivided by a grated flooring formed of metallic plates $g$ and cross-beams $h$. Said plates, which form the floor proper of the upper chamber, are composed of a frame and bars running at angles with one another, as shown in Fig. 3, all cast into one plate, the bars therein running at angles, as shown, to enable the laborer to shovel the material held thereon with facility. These plates, which are longitudinally strengthened by the ribs z, Fig. 4, are laid from girder to girder, a large number of them composing the floor, as will be readily understood.

Communication to the chambers A B is gained by the doors i, placed in both front and rear walls.

The walls of the lower chambers are perforated at or near the ground by the exit-flue k, in which is placed the blower m, and which connects with the chamber C, having therein successive layers of transverse bars or boards r, so arranged as to break the fall of the water passing between them. The lower portion of the chamber C forms a receptacle, n, for a purpose hereinafter fully set forth, and the upper portion contains a water-spout or "rose," o, connected with a water main or reservoir, and adapted to spread the water in a thin spray over the before-mentioned cross-bars r. The exit-passage is continued by the passage k', holding therein a second blower, p.

Although we do not wish to restrict ourselves to ovens formed in pairs, as shown, yet, for various reasons—as, for instance, the utilization of the heat—the method of construction shown is far more preferable than a single oven would be.

In operating the invention, the animal matter is first wheeled or otherwise carted into the chamber A, and spread upon the grated flooring g h to a considerable depth. The doors i are then closed and the heat from the furnaces allowed an entrance to said chamber. The blowers m and p are then set in motion, and the heated air is drawn through said animal matter, through said grated flooring, and out through the passage k. The heated air from the furnace, being lighter than that surrounding it, will not pass directly from the passage e to the flue k, but will spread itself evenly through the whole chamber before passing out, as will be readily understood. The air passing through the animal matter, which is generally gathered from butcher-shops and is often in a state of putrescence, needs to be thoroughly purified from all ammoniacal and other odorous vapors before passing into the open air, and to do this the said vaporous air is drawn by the blower m from the lower chamber, and forced through the chamber C, where it is brought into intimate contact with the water diffused by the plates r. The ammonia and other odorous and obnoxious gases unite with the water, all mechanically-disconnected particles brought over by the blower are caught therein, and the air, with the aid of the second blower, p, is sent into the open atmosphere in all its original purity. The ammoniacal liquor and mechanically-divided sediment falls into the receptacle n, from which it may be withdrawn and utilized.

Having thus described our invention, what we wish to claim is—

1. The combination, with a drying oven or ovens divided into upper and lower chambers by a grated floor and communicating with a furnace, substantially as shown, of a chamber having a blower or blowers connected therewith, and having layers of transverse bars or boards arranged beneath a water-spout or rose, substantially as and for the purpose set forth and shown.

2. The oven having its outer walls tied, in the manner shown, by bolts and braces a b, and having the upper portion of said walls perforated by hot-air passages or flues e, and having the interior of said oven separated into chambers A B by metallic flooring composed of plates g, having diagonal bars therein, said plates being laid upon beams or girders, as shown, the lower chamber, B, having a lower exit, k, all being arranged and operating substantially as set forth and shown.

3. In an apparatus for drying bones, &c., the combination, with the beams or girders h, passing from wall to wall, of the plates g, having therein diagonal bars, as shown, and having longitudinal strengthening-ribs projecting from beneath, as shown, substantially as and for the purpose set forth and shown.

4. The combination, with the drying-ovens, of the exit-flues k k', the blowers m p, the chamber C, having therein transverse bars r, receptacle n, and spout or rose o, connected with a water main or reservoir, all arranged and operating substantially as and for the purposes set forth.

5. The combination, with the drying oven or ovens subdivided into upper and lower chambers, A B, by a grated flooring, g h, constructed and arranged as described, of the gallery or flooring y, adapted to give access to the upper-chamber door, as and for the purposes set forth and shown.

6. The combination, with the chambers A and B, separated by a grated floor, g h, constructed and arranged as described, of the flue e, connected with a furnace, which passes between the ovens, as shown, communicating with both, the dampers u, operated by the handled rod v, all arranged and operating substantially as and for the purposes set forth.

In testimony that we claim the foregoing we have hereunto set our hands this 18th day of October, 1880.

ALFRED LISTER.
EDWIN LISTER.

Witnesses:
OLIVER DRAKE,
CHARLES H. PELL.